US005723935A

United States Patent [19]
Tomikawa et al.

[11] Patent Number: 5,723,935
[45] Date of Patent: Mar. 3, 1998

[54] VIBRATION DRIVEN MOTOR

[75] Inventors: Yoshiro Tomikawa, Yonezawa; Tadao Takagi, Yokohama; Mitsuhiro Okazaki; Takatoshi Ashizawa, both of Kawasaki; Isao Sugaya, Yokohama, all of Japan

[73] Assignee: Nikon Corporation, Tokyo, Japan

[21] Appl. No.: 661,099

[22] Filed: Jun. 10, 1996

Related U.S. Application Data

[63] Continuation of Ser. No. 509,818, Aug. 1, 1995, abandoned.

[30] Foreign Application Priority Data

Aug. 1, 1994 [JP] Japan ................... 6-180279
Jul. 19, 1995 [JP] Japan ................... 7-182791

[51] Int. Cl.[6] .................................................. H02N 2/00
[52] U.S. Cl. .................... 310/323; 310/328; 310/333
[58] Field of Search .............................. 310/323, 328, 310/333

[56] References Cited

U.S. PATENT DOCUMENTS

| Re. 28,752 | 3/1976 | Balamuth et al. | 318/116 |
|---|---|---|---|
| 3,577,180 | 5/1971 | Albsmeir et al. | 333/71 |
| 3,842,294 | 10/1974 | Doi et al. | 310/328 |
| 3,859,546 | 1/1975 | Doi et al. | 310/328 |
| 3,931,600 | 1/1976 | Nagaehima et al. | 333/71 |
| 4,099,211 | 7/1978 | Hathaway | 360/109 |
| 4,240,285 | 12/1980 | Langdon | 73/327 |
| 4,453,103 | 6/1984 | Vichnevsky et al. | 310/323 |
| 4,912,351 | 3/1990 | Takata et al. | 310/323 |
| 4,965,482 | 10/1990 | Ohniehi et al. | 310/323 |
| 5,051,647 | 9/1991 | Uchikawa et al. | 310/323 |
| 5,105,117 | 4/1992 | Yamaguchi | 310/323 |
| 5,200,665 | 4/1993 | Iijima | 310/323 |
| 5,233,274 | 8/1993 | Honda et al. | 310/316 |
| 5,559,387 | 9/1996 | Buerrier | 310/328 |
| 5,589,723 | 12/1996 | Yoshida et al. | 310/328 |

FOREIGN PATENT DOCUMENTS

| 0 674 350 | 9/1995 | European Pat. Off. | H01L 41/09 |
|---|---|---|---|
| 0005550 | 1/1978 | Japan | 310/333 |
| 0100283 | 8/1979 | Japan | 310/333 |
| 62-203570 | 9/1987 | Japan | H02N 2/00 |
| 0015279 | 1/1991 | Japan | 310/323 |

*Primary Examiner*—Thomas M. Dougherty
*Attorney, Agent, or Firm*—Shapiro and Shapiro

[57] ABSTRACT

A vibration driven motor can be driven with high torque at high rotation, and has a simple structure that can be manufactured easily. The motor may comprise a stator in a cylindrical form, a rotor disposed on the end surface of the stator and a pressing member for pressing the rotor on the stator with pressure, the stator may include a first piezoelectric electro-mechanical converting element for generating torsional vibration around the axis of the stator, a second electro-mechanical converting element for generating longitudinal vibration in the axial direction of the stator, and a pair of substantially semi-cylindrical vibration members, and the first or second piezoelectric element may be one or more plate-like members sandwiched by the vibration members of the stator.

20 Claims, 11 Drawing Sheets

VIBRATION DRIVEN MOTOR

This is a continuation of application Ser. No. 08/509,818 filed Aug. 1, 1995, now abandoned.

BACKGROUND OF THE INVENTION

1. Field of the Invention

The present invention relates to a vibration driven motor which uses longitudinal vibration and torsional vibration.

2. Related Background Art

FIG. 13 is a perspective view showing a conventional example of a vibration driven motor of a longitudinal/torsional vibration type.

In conventional vibration driven motors of this type, a stator 101 has a piezoelectric element 104 for torsional vibration sandwiched between two cylindrical vibration elements 102 and 103. Above the vibration element 103, a piezoelectric element 105 for longitudinal vibration is disposed. The piezoelectric element 104 for torsional vibration is polarized in the circumferential direction, and the piezoelectric element 105 for longitudinal vibration is polarized in the direction of thickness. Further, a rotor 106 is disposed above the piezoelectric element 105 for longitudinal vibration.

The vibration elements 102 and 103 and the piezoelectric elements 104 and 105 which constitute the stator 101 are fixed to a shaft 107 (threadably engaged with a screw portion of the shaft 107). The rotor 106 is rotatably arranged on the shaft 107 through a ball bearing 108. The tip end of the shaft 107 is threadably engaged with a nut 110 through a spring 109, and the rotor 106 is brought into contact by pressure with the stator 101.

The piezoelectric element 104 for torsional vibration and the piezoelectric element 105 for longitudinal vibration are driven by a phase control of a voltage, having the single frequency output from an oscillator 111, by a phase shifter 112.

A mechanical displacement for rotating the rotor 106 is applied to the piezoelectric element 104 for torsional vibration. The piezoelectric element 105 for longitudinal vibration plays a role of converting the vibration into movement to one direction by synchronizing the frictional force working between the stator 101 and the rotor 106 with a period of the torsional vibration caused by the piezoelectric element 104 to fluctuate said frictional force periodically.

FIG. 14 is a perspective view showing a developed state of the stator of the vibration driven motor of the prior art.

Since the piezoelectric element 104 for torsional vibration is required to be polarized in the circumferential direction, a piezoelectric material thereof is divided into six to eight fan-shaped pieces, as shown in FIG. 14. After being polarized, the pieces are assembled to form a a ring-shaped part. Note that a reference numeral 104a denotes an electrode.

In the conventional vibration driven motor mentioned above, it is difficult to obtain a precision in shape when the piezoelectric element for torsional vibration is assembled in the ring form. Also, because it is required to make holes at the central portions of the piezoelectric elements in order to pass the shaft therethrough, the cross-sectional areas of the piezoelectric elements become small. As a result is difficult to attain high torque and high rotation for the motor.

SUMMARY OF THE INVENTION

An object of the present invention is to provide a vibration driven motor which can solve the above-mentioned problems, can be driven at high rotation, and has a simple structure that can be easily manufactured.

In order to solve the above-mentioned problems, according to an embodiment of the present invention, there is provided a vibration driven motor which comprises a cylindrical vibration element, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, and in which said vibration element consists of two substantially semi-cylindrical members, and each of said first and second electro-mechanical members consists of one or more plate-like members sandwiched between said members of said vibration element.

According to another embodiment of the present invention, there is provided a vibration driven motor which comprises a cylindrical vibration element, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, and in which said vibration element consists of two substantially semi-cylindrical members, said first electro-mechanical member consists of one or more plate-like members sandwiched between said members of said vibration element, and said second electro-mechanical member has a respective axially extending portion disposed on the outer peripheral side of each said member of said vibration element.

According to still another embodiment of the present invention, there is provided a vibration driven motor which comprises a vibration element formed in a bar shape, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, and in which said vibration element consists of a plurality of bar-shaped members and each of said first and second electro-mechanical converting elements consists of one or more plate-like members sandwiched between said plurality of bar-shaped members in a direction crossing the axis of said vibration element.

In this case, it is possible to provide a shaft to be inserted substantially on the axis of said vibration element, into said vibration element so as not to pass therethrough and to project from only one end of the vibration element, and then to rotatably dispose said relative moving element on the projecting part. Also, both said vibration element and said bar-shaped members may be formed in an angular (e.g., rectangular) pillar shape.

According to still another embodiment of the present invention, there is provided a vibration driven motor which comprises a vibration element formed in a bar shape, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, and in which said vibration element consists of a plurality of bar-shaped members, said first electro-mechanical converting element consists of one or more plate-like members sandwiched between said plurality of bar-shaped members in a direction crossing the axis of said vibration element, and said second electro-mechanical converting element has a respective axially extending portion disposed on the outer peripheral side of each of the divided parts of said vibration element.

In this case, it is possible to provide a shaft to be inserted substantially on the axis of said vibration element, into said vibration element so as not to pass therethrough and to project from one end of the vibration element, and then to rotatably dispose said relative moving element on the projecting part. Also, both said vibration element and said bar-shaped members may be formed in a rectangular pillar shape.

According to still another embodiment of the present invention, there is provided a vibration driven motor which comprises a vibration element formed in a bar shape, a relative moving element pressed on said vibration element with pressure, and a plurality of electro-mechanical converting elements for generating two different types of vibration on said vibration element, and in which said vibration element has a drive surface substantially perpendicular to the axis, with the torsional vibration caused by a shearing deformation in the axial direction and the longitudinal vibration by a longitudinal deformation in the axial direction during driving of said plurality of electro-mechanical converting elements, and said relative moving element is driven in a state of pressure contact with the drive surface.

According to still another embodiment of the present invention, there is provided a vibration driven motor which comprises a vibration element formed in a bar shape, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, and in which said first electro-mechanical converting element and said second electro-mechanical converting element are bonded to said vibration element, and a joint face therebetween is disposed substantially in parallel to the axial direction of said vibration element.

According to still another embodiment of the present invention, there is provided a vibration driven motor which comprises a vibration element formed in a bar shape, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, in which said vibration element consists of a plurality of bar-shaped members and said first and second electro-mechanical converting elements are sandwiched between said plurality of bar-shaped members in a direction crossing the axis of said vibration element, characterized in that said first and second electro-mechanical converting elements are layered with each other in such a manner that a surface parallel substantially to a dividing surface for passing substantially through the center of said vibration element to divide said vibration element in a longitudinal direction is used as an interface so that the layering order can be changed around the axis of said vibration element.

According to still another embodiment of the present invention, there is provided a vibration driven motor which comprises a vibration element formed in a bar shape, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, in which said vibration element consists of a plurality of bar-shaped members, and each member is fixed in a direction substantially perpendicular to said axis by a connective member.

According to still another embodiment of the present invention, there is provided a vibration driven motor which comprises a vibration element formed in a bar shape, a relative moving element disposed on the end surface of said vibration element, a first electro-mechanical converting element for generating torsional vibration around the axis of said vibration element, a second electro-mechanical converting element for generating longitudinal vibration in the axial direction of said vibration element, and a pressing member for pressing said relative moving element on said vibration element with pressure, in which said vibration element consists of three or more bar-shaped members, and said first electro-mechanical converting element and said second electro-mechanical converting element are respectively fixed by bonding in a state that they are respectively sandwiched between said bar-shaped members in a direction crossing the axis of said vibration element.

In this case, the vibration element may be formed in a cylindrical shape with three bar-shaped members, and may be also be formed in a cylindrical shape with four bar-shaped members. It is also possible to form said vibration element in a quadrangular shape with four bar-shaped members.

According to the present invention, the first and second electro-mechanical converting elements may be plate-like members sandwiched between members of a vibration element so that the assembly is very easy. Further, if the second electro-mechanical converting element is disposed on the outer peripheral side of said vibration element, the assembly becomes easier.

Since the plate-like member is used as the first electro-mechanical converting element, it is possible to reduce the cost of the electro-mechanical converting element. Also, since each electro-mechanical converting element can be arranged to have a large area, it is possible to realize a high-rotating motor with high torque.

When the vibration element is formed in an angular (e.g., rectangular) pillar shape, only a plane processing is required to manufacture the vibration element, which results in easy processing of the vibration element and is advantageous in term of mass production. Also, since only the plane processing is required, it is easy to improve the precision in processing of the bonding face of the piezoelectric element which requires flatness.

Furthermore, if the number of parts constituting the vibration element is increased, the area of the electro-mechanical converting element which is in contact with the vibration element becomes larger. As a result, a force for generating vibration by the electro-mechanical converting element becomes greater so that it is possible to increase an output of the motor.

DESCRIPTION OF THE PREFERRED EMBODIMENTS

[FIRST EMBODIMENT]

Embodiments of the present invention will be described more fully in the following, with reference to the drawings.

Figure 1:
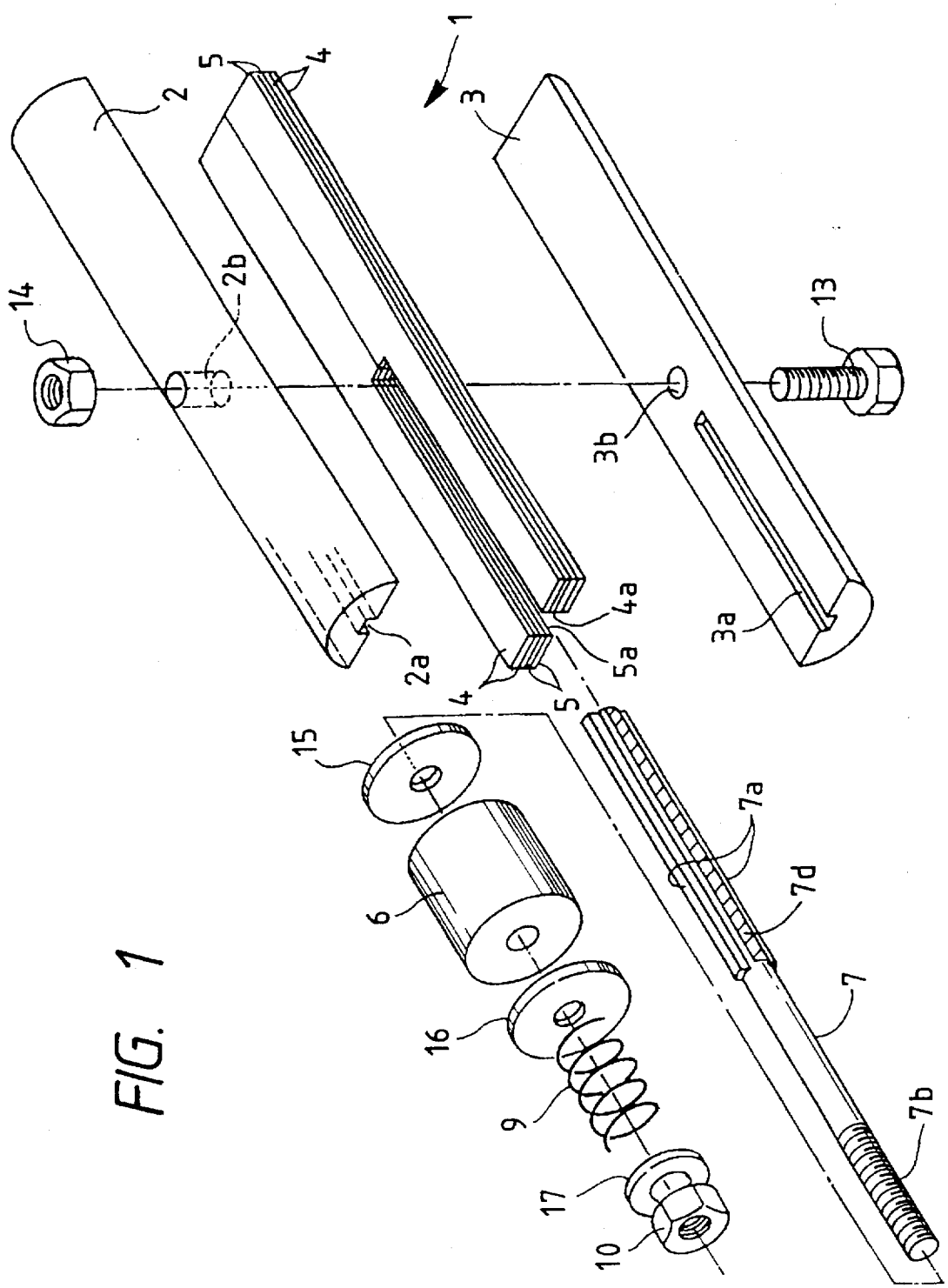
FIG. 1 is a perspective view showing a first embodiment of the vibration driven motor according to the present invention in a developed state.
Figure 2:
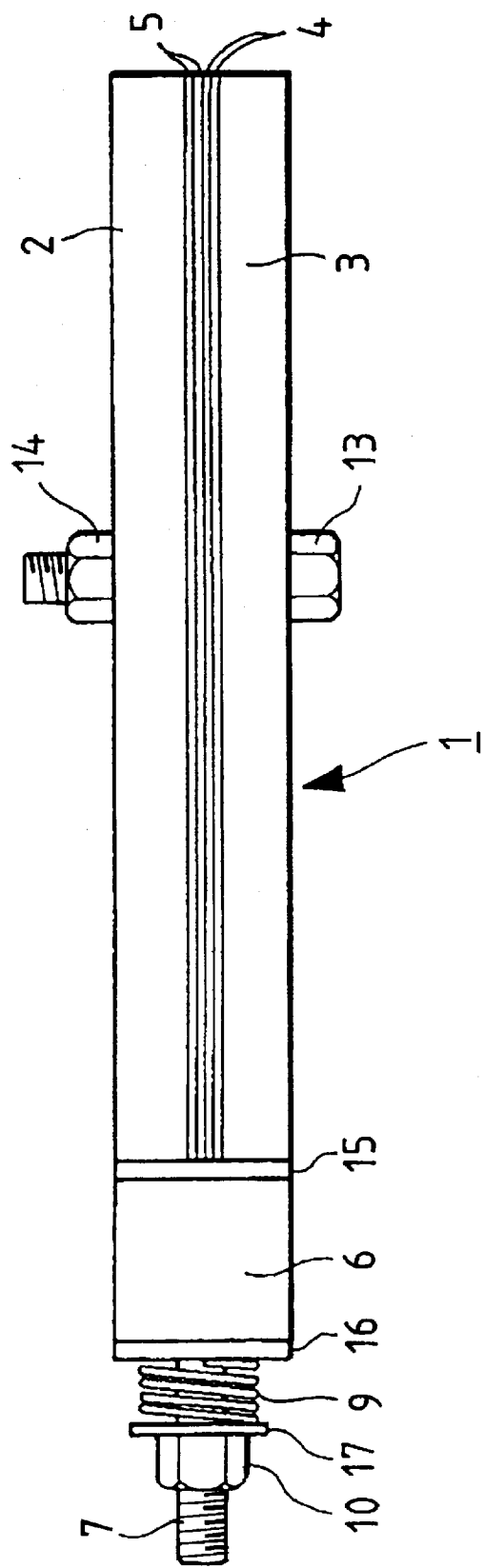
FIG. 2 is a perspective view showing the vibration driven motor of FIG. 1 in its assembled state.

FIG. 1 is a perspective view showing the first embodiment of the vibration driven motor according to the present invention in a developed state, while FIG. 2 is a perspective view showing the vibration driven motor of FIG. 1 in its assembled state.

In the first embodiment, a stator 1 has four each of plate-like piezoelectric elements 4 and 5 sandwiched substantially between semi-cylindrical members 2 and 3 (arrangement of the piezoelectric elements will be described with reference to FIGS. 3A to 3C), and a shaft 7 is inserted along the axis of the stator 1. A rotor 6 is rotatably disposed on the shaft 7.

On one end portion of the shaft 7, there are formed two projections 7a in the axial direction of the outer periphery, and a screw portion 7b is formed on an opposite end portion thereof. On the members 2 and 3, grooves 2a and 3a to which the projections 7a of the shaft 7 are fitted are formed in parallel with the central axis of the stator 1. Also on the piezoelectric elements 4 and 5, cut-away portions 4a and 5a are formed at positions into which the projections 7a of the shaft 7 are inserted.

Note that since the shaft 7 is in contact with the cut-away portions 4a and 5a of the piezoelectric elements, a molded portion 7d may be formed on the side surface of the shaft.

On the members 2 and 3, bolt holes 2b and 3b are also formed in a direction perpendicular to the central axis of the stator 1. These members 2 and 3 sandwich the piezoelectric elements 4 and 5 and are fastened to be fixed by a bolt 13 and a nut 14 in the state in which the shaft 7 is fitted.

The rotor 6 may be mounted on the shaft 7 to be in contact with the end of the stator 1. However, in this embodiment, a sliding member 15 made of PPS or the like is inserted therebetween. Moreover, a sliding member 16, a spring 9 and a washer 17 are mounted on the shaft 7 in the named order on the opposite side of the rotor 6, and are fastened by a nut 10, thereby pressing the rotor 6 against the stator 1 (through the sliding member 15) with pressure.

Figure 3A:
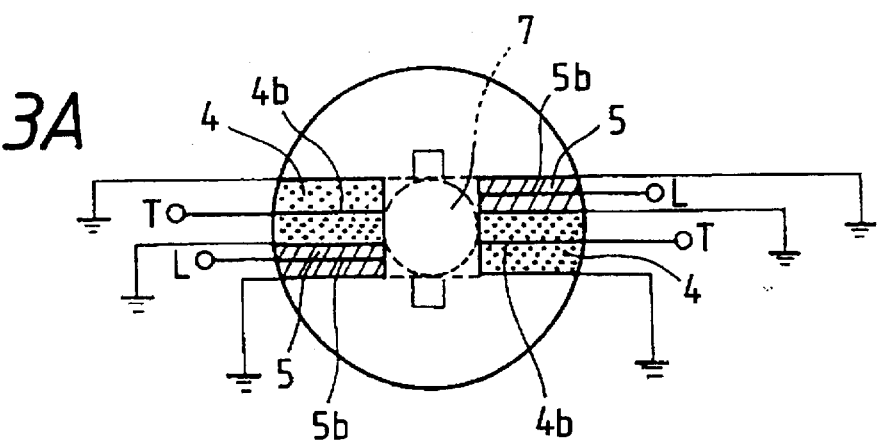
FIGS. 3A to 3C are views showing arrangements of piezoelectric elements of the vibration motor according to the first embodiment.
Figure 3B:
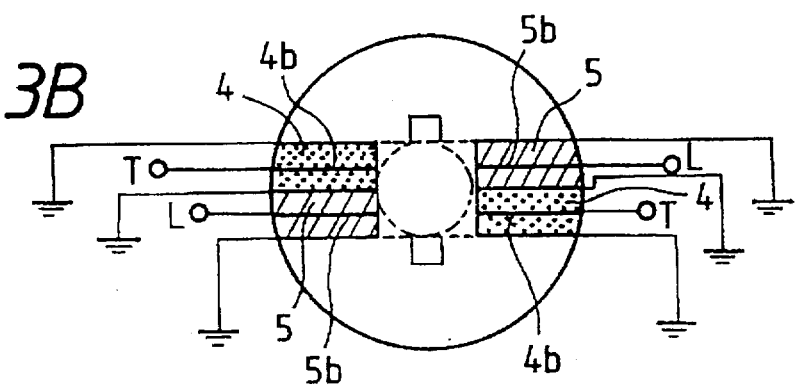
Figure 3C:
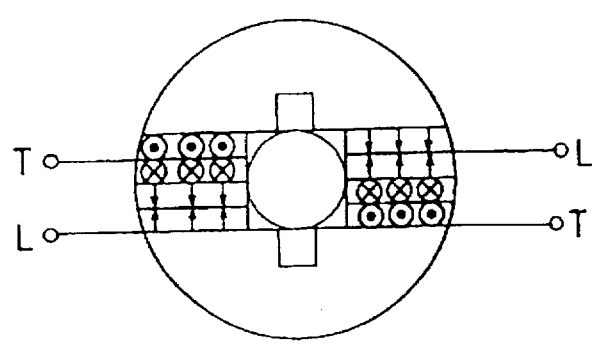

FIGS. 3A to 3C are views showing arrangements of piezoelectric elements of the vibration motor according to the first embodiment.

Each piezoelectric element 4 is a device for torsional vibration, while each piezoelectric element 5 is a device for longitudinal vibration. Two of the piezoelectric elements 4 are arranged in the upper left part of FIG. 3A and the other two in the lower right part. Two of the piezoelectric elements 5 are arranged in the upper right part of FIG. 3A and the other two in the lower left part.

An electrode 4b is disposed between each pair of piezoelectric elements 4, and an electrode 5b is disposed between each pair of piezoelectric elements 5. The electrodes 4b and 5b are formed by metallic foil such as phosphor bronze, and are bonded and fixed to the piezoelectric elements 4 and 5 or fastened and fixed by the bolt 13 and the nut 14. Portions between the piezoelectric elements and the members 2 and 3 are grounded. Portions between adjacent piezoelectric elements 4 and 5 are also grounded via grounding electrodes, as shown.

FIG. 3A shows a case in which the thickness of the piezoelectric element 4 for torsional vibration is different from that of the piezoelectric element 5 for longitudinal vibration. FIG. 3B shows a case in which the both thicknesses are equal to each other. The case in FIG. 3A is advantageous in that a large amplitude of the torsional vibration can be obtained.

FIG. 3C shows a direction of polarization of each piezoelectric element 4 for torsional vibration and that of each piezoelectric element 5 for longitudinal vibration. Each piezoelectric element 4 for torsional vibration is polarized in the axial direction of the motor, and each piezoelectric element 5 for longitudinal vibration is polarized in the direction of thickness of the element. Note that the piezoelectric elements of each pair have opposite polarizations.

FIGS. 4A and 4B and FIGS. 5A and 5B are views showing a direction of polarization and an arrangement of electrodes of the piezoelectric elements used in the vibration motor according to the present embodiment, and deformation upon voltage application thereof.

Figure 4A:
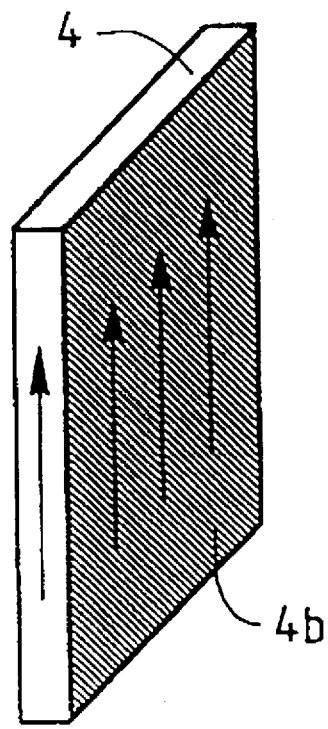
FIGS. 4A and 4B are views showing a direction of polarization and an arrangement of an electrode of the piezoelectric element (for torsional vibration) used in the vibration motor according to the present embodiment, and a deformation upon voltage application thereof.
Figure 4B:
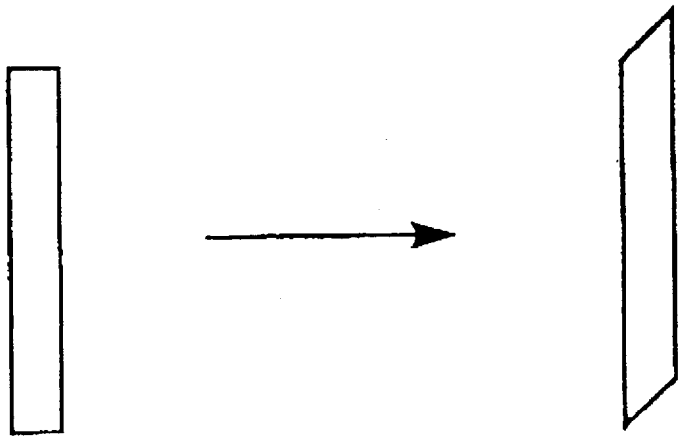

The piezoelectric element 4 for torsional vibration is polarized in the direction of length of the flat plane, as shown in FIG. 4A. When voltage is applied by use of the electrode of FIG. 4A, the stator 1 can be torsionally vibrated by use of the shearing deformation, as shown in FIG. 4B.

Figure 5A:
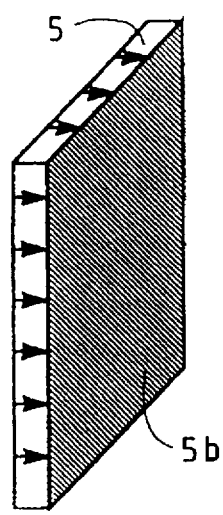
FIGS. 5A and 5B are views showing a direction of polarization and an arrangement of an electrode of the piezoelectric element (for longitudinal vibration) used in the vibration motor according to the present embodiment, and a deformation upon voltage application thereof.
Figure 5B:
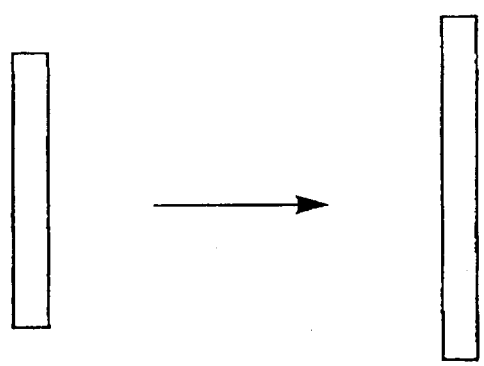

The piezoelectric element 5 for longitudinal vibration is polarized in the direction of thickness of the flat plane, as shown in FIG. 5A. When voltage is applied by use of the electrode of FIG. 5A, the piezoelectric element is elongated and deformed, as shown in FIG. 5B. The stator 1 can be longitudinally vibrated by use of this deformation of the piezoelectric element 5.

In order to drive the motor efficiently, it is desirable to make the oscillation frequency of the torsional vibration of the motor substantially the same that of the longitudinal vibration so as to enlarge an amplitude of the rotational displacement and an amplitude of the longitudinal vibration simultaneously. In order to make these oscillation frequencies substantially the same, it is required to obtain the optimal condition by varying a material and a shape of the stator 1, a material and a shape of the rotor 6, a material and a shape of the sliding members 15 and 16, a pressing force, and the like.

Next, a timing of the torsional vibration and that of the longitudinal vibration will be described.

Figure 6A:
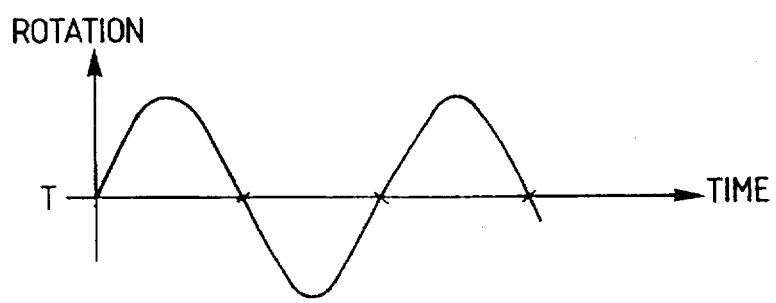
FIGS. 6A and 6B are charts showing voltage wave forms to be applied to the piezoelectric elements of the vibration motor according to the present embodiment.
Figure 6B:
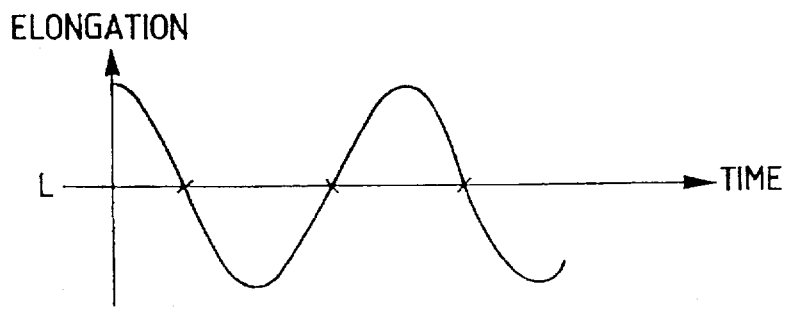

Referring FIGS. 6A and 6B, when a displacement of the piezoelectric element 5 for longitudinal vibration is the positive direction (the direction in which the stator 1 and the rotor 6 are brought into contact) and a rotational displacement of the piezoelectric element 4 for torsional vibration is the positive direction, the torsional vibration of the stator 1 is transmitted to the rotor 6 to rotate it in the positive direction.

When a displacement of the piezoelectric element 5 for longitudinal vibration is the negative direction (the direction in which the stator 1 is separated away from the rotor 6) and a rotational displacement of the piezoelectric element 4 for torsional vibration is the negative direction, the torsional vibration of the stator 1 is not transmitted to the rotor 6 and the rotor does not rotate.

By repeating this operation, the rotor 6 is rotated in a predetermined direction.

In order to obtain the torsional vibration and the longitudinal vibration as mentioned above, an alternating voltage is applied to the piezoelectric element 4 for torsional vibration and the piezoelectric element 5 for longitudinal vibration, with a phase difference of about 90° between the elements 4 and 5. It is possible to improve the torque, the number of rotations, and the efficiency of the motor by adjusting the phase difference and selecting the optimal value.

The above-mentioned phase difference can be changed from 90° to −90° for reversing the rotational direction of the motor. By this change, the direction of the torsional vibration to be transmitted to the rotor 6 is reversed to make a reverse rotation.

[SECOND EMBODIMENT]

Figure 7:
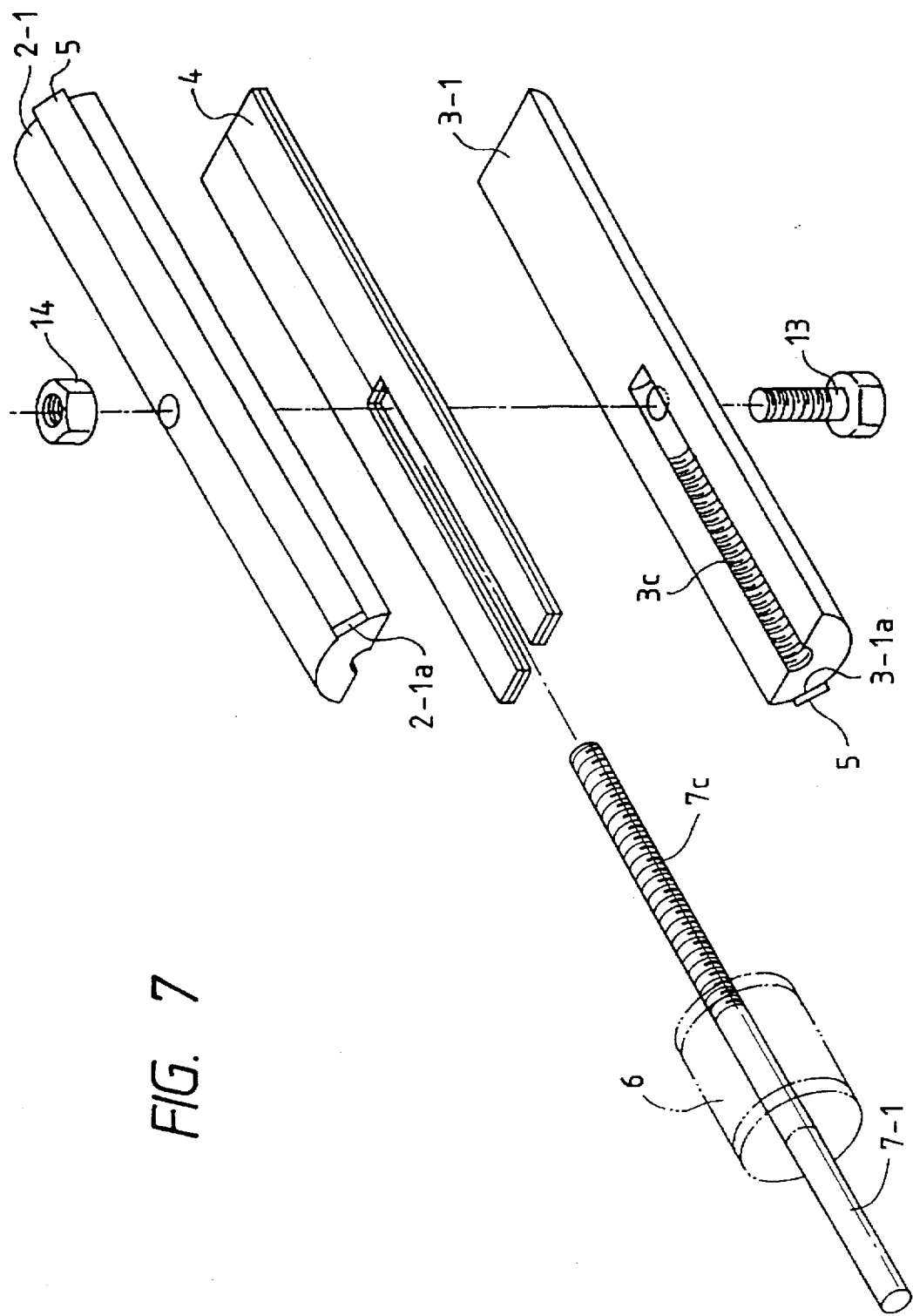
FIG. 7 is a perspective view showing a second embodiment of the vibration driven motor according to the present invention in its developed state.

FIG. 7 is a perspective view showing the second embodiment of the vibration driven motor according to the present invention in its developed state. In the embodiment described below, portions performing the same functions as those in the foregoing first embodiment are given the same reference numbers, and description thereof will be omitted.

In the second embodiment, the piezoelectric elements 4 for torsional vibration are sandwiched between substantially semi-cylindrical members 2-1 and 3-1. However, the piezoelectric elements 5 for longitudinal vibration are disposed on molded portions 2-1a and 3-1a which are formed in the axial direction along the outer peripheries of the members 2-1 and 3-1.

Further, the members 2-1 and 3-1 and a shaft 7-1 are connected to each other by spring threaded portions 2c, 3c and 7c. In this case, it is preferable to form the portions 2c and 3c after fastening the members 2-1 and 3-1 by the bolt 13 and the nut 14.

Other structures and operations are substantially the same as those in the first embodiment.

[THIRD EMBODIMENT]

Figure 8:
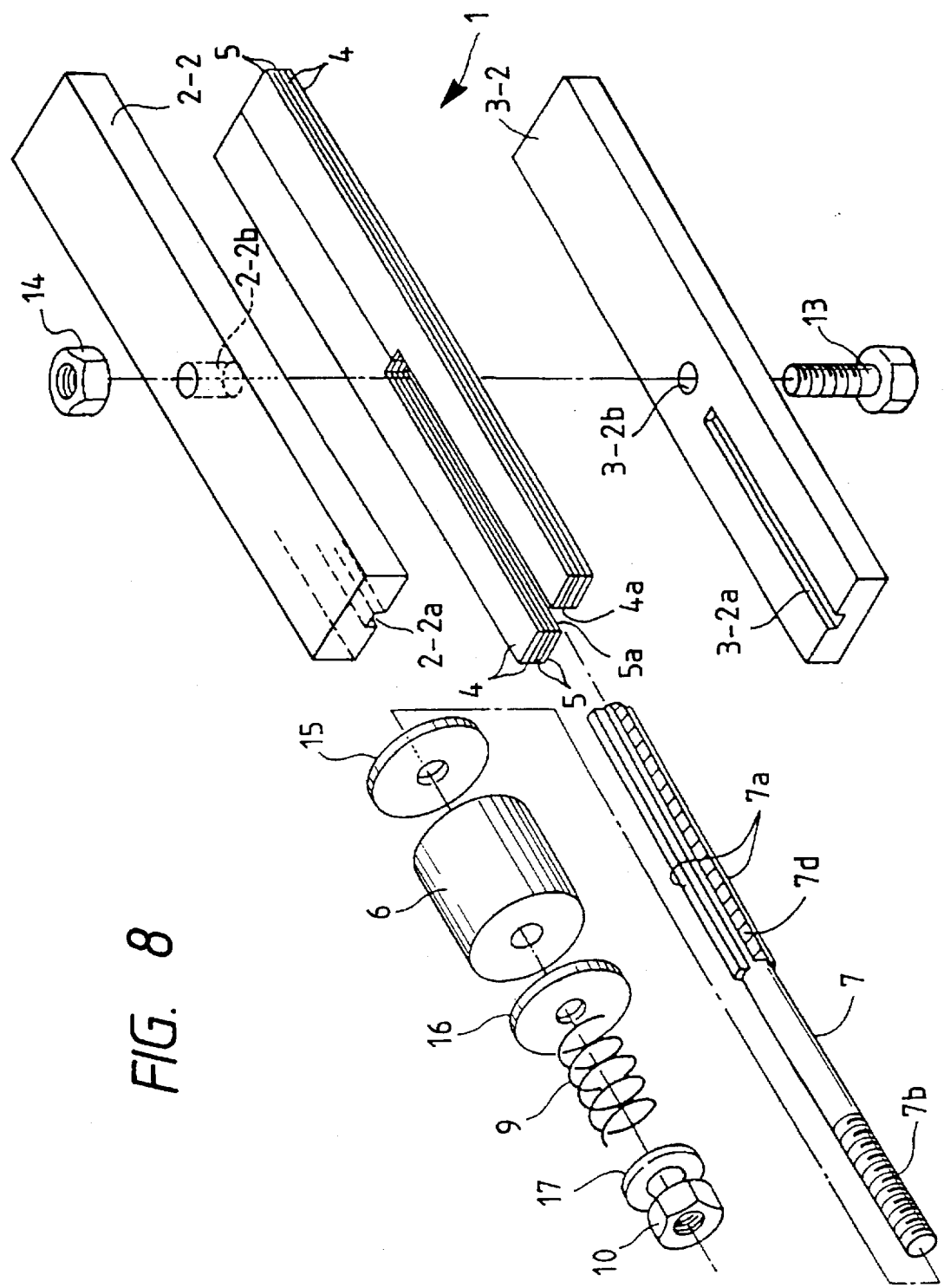
FIG. 8 is a perspective view showing a third embodiment of the vibration driven motor according to the present invention in a developed state.

FIG. 8 is a perspective view of a stator used in the third embodiment of the vibration driven motor according to the present invention. The third embodiment is different from the first embodiment only in that the shape of the stator is an angular (specifically rectangular) pillar. Other structures and operations are substantially the same as those in the first embodiment. Therefore, portions performing the same functions as those in the foregoing first embodiment are given the same reference numbers, and description thereof will be omitted.

In this third embodiment, the stator is divided into rectangular pillar members 2-2 and 3-2. For this reason, the stator can be produced only by conducting a plane processing, whereby the stator can be easily processed, and this is advantageous in terms of a mass production. Since the stator can be produced by the plane processing, it becomes easy to improve precision in processing a bonding surface for the piezoelectric element which requires flatness.

[FOURTH EMBODIMENT]

Figure 9:
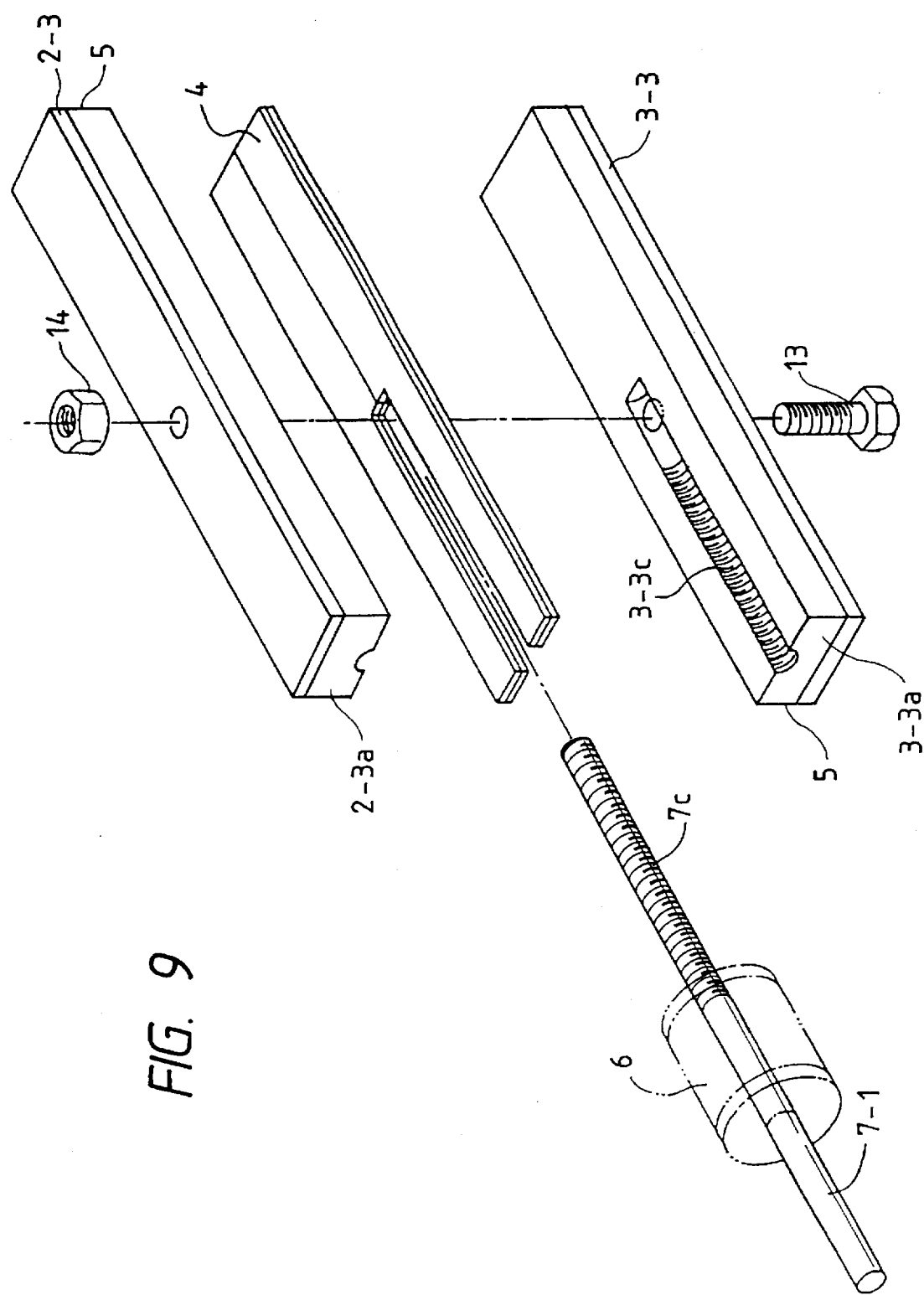
FIG. 9 is a perspective view showing a fourth embodiment of the vibration driven motor according to the present invention in a developed state.

FIG. 9 is a perspective view of a stator used in the fourth embodiment of the vibration driven motor according to the present invention. The fourth embodiment is different from the second embodiment only in that the shape Of the stator is a rectangular pillar. Other structures and operations are substantially the same as those in the second embodiment. Therefore, portions performing the same functions as those in the foregoing second embodiment are given the same rectangular numbers, and description thereof will be omitted.

In this fourth embodiment, the stator is divided into rectangular pillar members 2-2 and 3-2. For this reason, the stator can be produced by conducting the plane processing, whereby the stator can be easily processed. Again, this is advantageous in terms of mass production. Since the stator can be produced by the plane processing, it becomes easy to improve precision in processing a bonding surface for the piezoelectric element which requires flatness. Further, since the piezoelectric element for longitudinal vibration is disposed on the outer periphery of the stator, assembly becomes easier.

[FIFTH EMBODIMENT]

Figure 10:
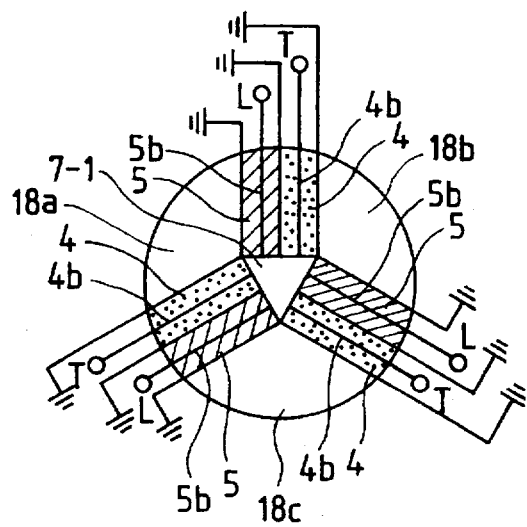
FIG. 10 is a view showing an arrangement of the piezoelectric elements of the vibration motor in which a stator is formed of three bar-shaped members according to a fifth embodiment.
Figure 11:
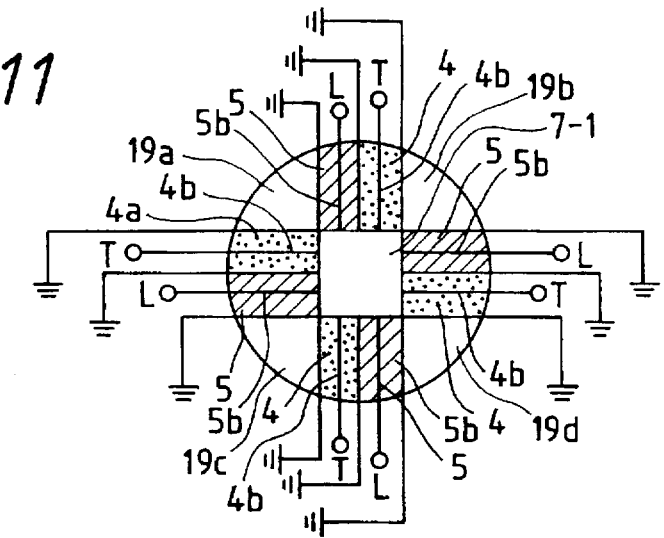
FIG. 11 is a view showing an arrangement of the piezoelectric elements of the vibration motor in which the stator is formed of four bar-shaped members according to a fifth embodiment.
Figure 12:
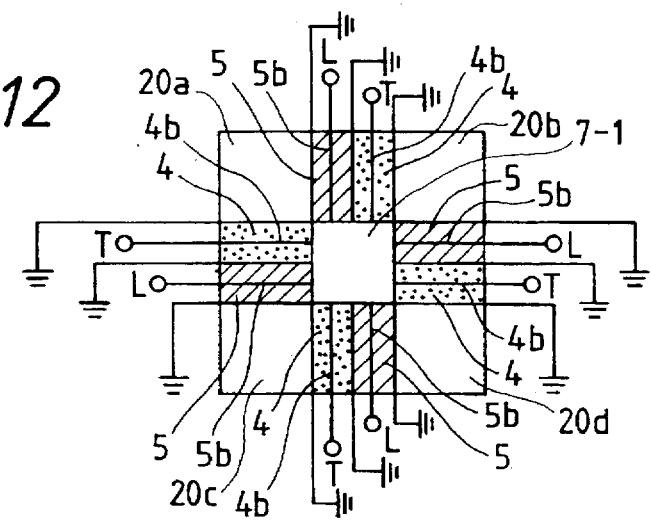
FIG. 12 is a view showing an arrangement of the piezoelectric elements of the vibration motor in which the stator of FIG. 11 is formed in a rectangular pillar shape.
Figure 13:
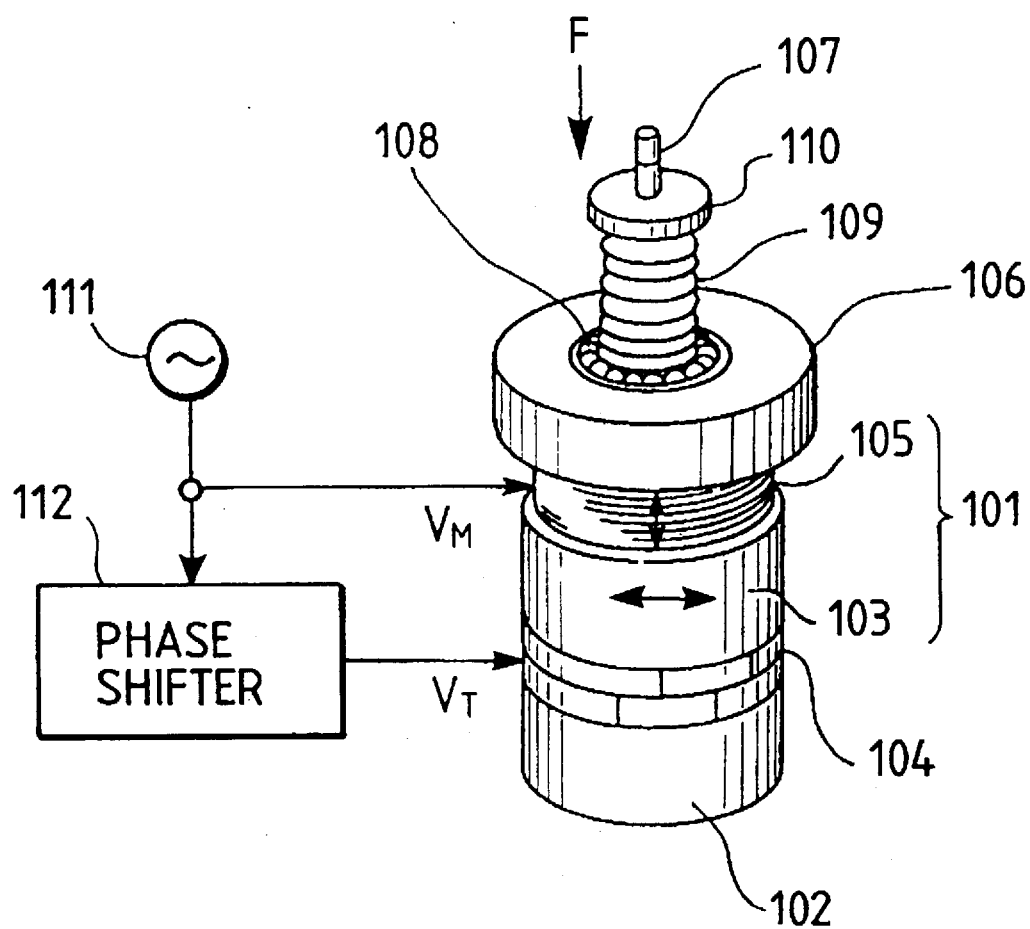
FIG. 13 is a perspective view showing a vibration driven motor of a longitudinal/torsional vibration type according to the prior art.
Figure 14:
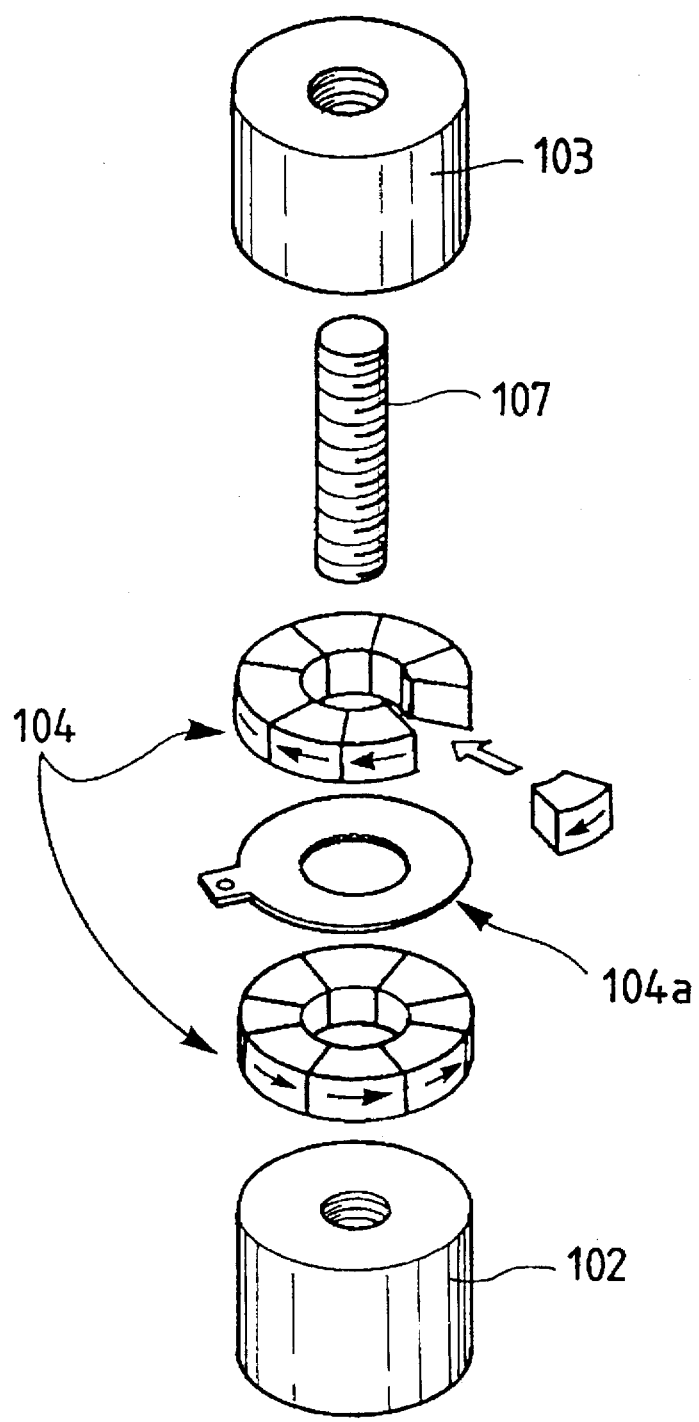
FIG. 14 is a perspective view showing a rotor of the vibration driven motor of the prior art in a developed state.

FIGS. 10, 11 and 12 are views showing arrangements of piezoelectric elements of a stator used in the fifth embodiment of the vibration driven motor according to the present invention. In the fifth embodiment, the stator is constituted by three or more components. Other structures and operations are substantially the same as those in the first embodiment. Therefore, portions performing the same functions as those in the foregoing first embodiment are Given the same reference numbers, and description thereof will be omitted.

In FIG. 10, the stator 18 is constituted by combining three bar-shaped members 18a to 18c each of which has substantially a fan-shaped cross section. In this case, the piezoelectric elements 4, 5 and the shaft 7-1 are preferably fixed in the stator by bonding. The piezoelectric elements are bonded in a state in which they are sandwiched between the bar-shaped members, as shown.

In FIG. 11, the stator 19 is constituted by combining four bar-shaped members 19a to 19d each of which has substantially a quarter-circular cross section.

In FIG. 12, the stator 20 is constituted by combining four bar-shaped members 20a to 20d and arranged to have a rectangular cross section.

In the fifth embodiment, since the area of each of the piezoelectric elements which is in contact with the stator becomes larger, the force for generating the vibration by the piezoelectric elements becomes greater. For this reason, an output of the motor can be increased.

Note that, in the fifth embodiment, like in the second or fourth embodiment, the piezoelectric element for longitudinal vibration may be disposed on the outer periphery of the stator.

The present invention is not limited to the embodiments described above, and many modifications are possible. For example, the foregoing embodiments use piezoelectric elements as electro-mechanical converting elements for converting the electric energy into mechanical energy. However, electrostrictive elements may be used instead.

As fully described above, according to the present invention, assembling of the vibration driven motor becomes very easy. Further, since plate-like members are used to form the electro-mechanical converting elements, the cost for the electro-mechanical converting elements can be reduced. Further, since the electro-mechanical converting elements can be arranged to have a large area, a high torque vibration driven motor of high rotation can be realized.

What is claimed is:

1. A vibration driven motor, comprising:
   a cylindrical stator assembly including a vibration element having two substantially semi-cylindrical vibration members, and an electro-mechanical converting device in contact with said two vibration members;
   a relative moving element disposed on an end surface of said vibration element and effecting movement relative to said vibration element;
   a pressing member for pressing said relative moving element against said vibration element; and
   a mounting device attached to said stator assembly and supporting said relative moving element and said pressing member;
   wherein said electro-mechanical converting device includes a first electro-mechanical converting element for generating, upon application of a first alternating voltage, torsional vibration in said vibration element around an axis of said vibration element, and a second electro-mechanical converting element for generating, upon application of a second alternating voltage of different phase than said first alternating voltage, longitudinal vibration in said vibration element in an axial direction of said vibration element; and
   said first and second electro-mechanical converting elements each include at least one plate-like member sandwiched between flat portions of said vibration members.

2. A vibration driven motor, comprising:
   a cylindrical stator assembly including a vibration element having two substantially semi-cylindrical vibration members, and an electro-mechanical converting device in contact with said two vibration members;
   a relative moving element disposed on an end surface of said vibration element and effecting movement relative to said vibration element;
   a pressing member for pressing said relative moving element against said vibration element; and
   a mounting device attached to said stator assembly and supporting said relative moving element and said pressing member;
   wherein said electro-mechanical converting device includes a first electro-mechanical converting element for generating, upon application of a first alternating voltage, torsional vibration in said vibration element around an axis of said vibration element, and a second electro-mechanical converting element for generating, upon application of a second alternating voltage of different phase than said first alternating voltage, longitudinal vibration in said vibration element in an axial direction of said vibration element;
   said first electro-mechanical converting element includes at least one plate-like member sandwiched between flat portions of said vibration members; and
   said second electro-mechanical converting element includes a respective axially extending member disposed on an outer periphery of each vibration member.

3. A vibration driven motor, comprising:
   a bar-shaped stator assembly including a vibration element having a plurality of bar-shaped vibration members, and an electro-mechanical converting device disposed in contact with said vibration members;
   a relative moving element disposed on an end surface of said vibration element and effecting movement relative to said vibration element;
   a pressing member for pressing said relative moving element against said vibration element; and
   a mounting device attached to said stator assembly and supporting said relative moving element and said pressing member;
   wherein said electro-mechanical converting device includes a first electro-mechanical converting element for generating, upon application of a first alternating voltage, torsional vibration in said vibration element around an axis of said vibration element, and a second electro-mechanical converting element for generating, upon application of a second alternating voltage of different phase than said first alternating voltage, longitudinal vibration in said vibration element in an axial direction of said vibration element; and
   said first and second electro-mechanical converting elements each include at least one plate-shaped member sandwiched by two of said vibration members, and facing surfaces of said plate-shaped member and said two vibration members are substantially orthogonal to said end surface of said vibration element.

4. A vibration driven motor according to claim 3, wherein said mounting device includes a fixed shaft inserted into said vibration element substantially along the axis of said vibration element, so as not to pass through said vibration element and to project from only one end of said vibration element, and said relative moving element is rotatably disposed on a projecting portion of said shaft.

5. A vibration driven motor according to claim 3, wherein said stator assembly and said vibration members are of rectangular pillar shape.

6. A vibration driven motor according to claim 4, wherein said stator assembly and said vibration members are of rectangular pillar shape.

7. A vibration driven motor, comprising:
a bar-shaped stator assembly including a vibration element having a plurality of bar-shaped vibration members, and an electro-mechanical converting device disposed in contact with said vibration members;
a relative moving element disposed on an end surface of said vibration element and effecting movement relative to said vibration element;
a pressing member for pressing said relative moving element against said vibration element; and
a mounting device attached to said stator assembly and supporting said relative moving element and said pressing member;
wherein said electro-mechanical converting device includes a first electro-mechanical converting element for generating, upon application of a first alternating voltage, torsional vibration in said vibration element around an axis of said vibration element, and a second electro-mechanical converting element for generating, upon application of a second alternating voltage of different phase than said first alternating voltage, longitudinal vibration in said vibration element in an axial direction of said vibration element;
said first electro-mechanical converting element includes at least one plate-like member sandwiched by two of said vibration members;
said second electro-mechanical converting element includes at least one electro-mechanical converting member disposed on an outer surface of one of said plurality of vibration members; and
facing surfaces of said plate-like member and said two vibration members are substantially orthogonal to said end surface of said vibration element, and said outer surface of said one vibration member and a facing surface of said electro-mechanical converting member are substantially orthogonal to said end surface.

8. A vibration driven motor according to claim 7, wherein said mounting device includes a fixed shaft inserted into said vibration element substantially along the axis of said vibration element, so as not to pass through said vibration element and to project from only one end of said vibration element, and said relative moving element is rotatably disposed on a projecting portion of said shaft.

9. A vibration driven motor according to claim 7, wherein said stator assembly and said vibration members are of rectangular pillar shape.

10. A vibration driven motor according to claim 8, wherein said stator assembly and said vibration members are of rectangular pillar shape.

11. A vibration driven motor, comprising:
a bar-shaped stator assembly including a vibration element and an electro-mechanical converting device which is disposed in contact with said vibration element and which causes said vibration element to undergo two different vibration modes;
a mounting device attached to said stator assembly; and
a relative moving element supported by said mounting device and which effects movement relative to said vibration element;
wherein said electro-mechanical converting device includes a first electro-mechanical converting element for generating torsional vibration in said vibration element about an axis of said vibration element, and a second electro-mechanical converting element for generating longitudinal vibration in said vibration element in an axial direction of said vibration element;
said vibration element has a drive surface substantially perpendicular to said axial direction and which transmits drive forces created by said torsional vibration and said longitudinal vibration to said relative moving element; and
said torsional vibration is generated by shearing-deformation of said first electro-mechanical converting element in a direction substantially orthogonal to said drive surface, and said longitudinal vibration is generated by elongation deformation of said second electro-mechanical converting element in a direction substantially orthogonal to said drive surface.

12. A vibration driven motor, comprising:
a bar-shaped stator assembly including a vibration element having a plurality of bar-shaped vibration members, and an electro-mechanical converting device disposed in contact with said vibration members;
a relative moving element disposed on an end surface of said vibration element and effecting movement relative to said vibration element;
a pressing member for pressing said relative moving element against said vibration element with pressure; and
a mounting device attached to said stator assembly and supporting said relative moving element and said pressing member;
wherein said electro-mechanical converting device includes a first electro-mechanical converting element for generating torsional vibration around an axis of said vibration element, and a second electro-mechanical converting element for generating longitudinal vibration in an axial direction of said vibration element;
said first electro-mechanical converting element includes an electro-mechanical converting member that is laminated to an electro-mechanical converting member of said second electro-mechanical converting element, with the laminated electro-mechanical converting members being sandwiched by vibration members of said vibration element; and
surfaces of said electro-mechanical converting members and the sandwiching vibration members that face each other and laminated surfaces of said electro-mechanical converting members are substantially orthogonal to surfaces of said relative moving element and said vibration element that face each other.

13. A vibration driven motor, comprising:
a bar-shaped stator assembly including a vibration element having a plurality of bar-shaped vibration members, and an electro-mechanical converting device disposed in contact with said vibration members;
a relative moving element disposed on an end surface of said vibration element and effecting movement relative to said vibration element;
a pressing member for pressing said relative moving element against said vibration element; and a mounting device attached to said stator assembly and supporting said relative moving element and said pressing member;

wherein said electro-mechanical converting device includes a first electro-mechanical converting element having first plate-like members for generating torsional vibration in said vibration element around an axis of said vibration element, and a second electro-mechanical converting element having second plate-like members for generating longitudinal vibration in said vibration element in an axial direction of said vibration element;

said first and second plate-like members are divided into an arrangement having two groups disposed on opposite sides of an axial plane of said vibration element, respectively, each group being constituted by a laminate of at least one first plate-like member and at least one second plate-like member and being sandwiched between opposed surfaces of a pair of said vibration members, which surfaces are substantially parallel to the axis of said vibration element; and an order of lamination along a direction perpendicular to the axis of said vibration element in said axial plane is different in said two groups.

14. A vibration driven motor, comprising:

a bar-shaped stator assembly including a vibration element having a plurality of bar-shaped vibration members, and an electro-mechanical converting device disposed in contact with said vibration members;

a relative moving element disposed on an end surface of said vibration element and effecting movement relative to said vibration element;

a pressing member for pressing said relative moving element against said vibration element; and a mounting device attached to said stator assembly and supporting said relative moving element and said pressing member;

wherein said electro-mechanical converting device includes a first electro-mechanical converting element for generating, upon application of a first alternating voltage, torsional vibration in said vibration element around an axis of said vibration element, and a second electro-mechanical converting element for generating, upon application of a second alternating voltage of different phase than said first alternating voltage, longitudinal vibration in said vibration element in an axial direction of said vibration element; and said stator assembly includes a connecting member connecting said vibration members to each other in a direction perpendicular to an axis of said vibration element, such that facing surfaces of said electro-mechanical converting device and said vibration members are substantially orthogonal to said end surface of said vibration element.

15. A vibration driven motor, comprising:

a bar-shaped stator assembly including a vibration element having at least three bar-shaped vibration members and an electro-mechanical converting device disposed in contact with said vibration members;

a relative moving element disposed on an end surface of said vibration element and effecting movement relative to said vibration element;

a pressing member for pressing said relative moving element against said vibration element; and a mounting device attached to said stator assembly and supporting said relative moving element and said pressing member;

wherein said electro-mechanical converting device includes a first electro-mechanical converting element for generating torsional vibration in said vibration element about an axis of said vibration element, and a second electro-mechanical converting element for generating longitudinal vibration in said vibration element in an axial direction of said vibration element; and each of said first electro-mechanical converting element and said second electro-mechanical converting element includes plate-like members sandwiched between pairs of said vibration members, with facing surfaces of the plate-like members and the corresponding pairs of vibration members being substantially orthogonal to said end surface of said vibration element.

16. A vibration driven motor according to claim 15, wherein said stator assembly is cylindrical and said vibration element has only three of said vibration members.

17. A vibration driven motor according to claim 15, wherein said stator assembly is cylindrical and said vibration element has only four of said vibration members.

18. A vibration driven motor according to claim 15, wherein said stator assembly is of quadrilateral pillar shape and has only four of said vibration members.

19. A vibration driven motor comprising:

a bar-shaped stator assembly including a vibration element having a plurality of bar-shaped vibration members, and an electro-mechanical converting device disposed in contact with said vibration members;

a relative moving element disposed on an end surface of said vibration element and effecting movement relative to said vibration element; and a pressing member for pressing said relative moving element against said vibration element;

wherein said electro-mechanical converting device includes a first electro-mechanical converting element for generating, upon application of a first alternating voltage, torsional vibration in said vibration element around an axis of said vibration element, and a second electro-mechanical converting element for generating, upon application of a second alternating voltage of different phase than said first alternating voltage, longitudinal vibration in said vibration element in an axial direction of said vibration element;

each of said first and second electro-mechanical converting elements has a two-layered structure including two plate-like electro-mechanical converting elements laminated together and sandwiched by two of said plurality of bar-shaped vibration members in a direction transverse to an axis of the two vibration members;

said first alternating voltage is applied between one of said vibration members and an electrode disposed between the electro-mechanical converting members of said first electro-mechanical converting element; and said second alternating voltage is applied between one of said vibration members and an electrode disposed between the laminated electro-mechanical converting members of said second electro-mechanical converting element.

20. A vibration driven motor comprising:

a bar-shaped stator assembly including a vibration element having a plurality of bar-shaped vibration members, and an electro-mechanical converting device disposed in contact with said vibration members;

a relative moving element disposed on an end surface of said vibration element and effecting movement relative to said vibration element; and a pressing member for pressing said relative moving element against said vibration element;

wherein said electro-mechanical converting device includes a first electro-mechanical converting element for generating, upon application of a first alternating voltage, torsional vibration in said vibration element around an axis of said vibration element, and a second electro-mechanical converting element for generating, upon application of a second alternating voltage of different phase than said first alternating voltage, longitudinal vibration in said vibration element in an axial direction of said vibration element;

said first electro-mechanical converting element has a two-layered structure including two plate-like electro-mechanical converting members laminated together and sandwiched by two of said plurality of vibration members in a direction transverse to the axis of said vibration element;

said first alternating voltage is applied between one of said plurality of vibration members and an electrode disposed between the laminated electro-mechanical converting members of said first electro-mechanical converting element; and said second electro-mechanical converting element has a portion disposed along the axis of said vibration element and joined to an outer surface of one of said plurality of vibration members.

* * * * *